3,002,138
ELECTRICALLY POWERED OSCILLATORY BALANCE

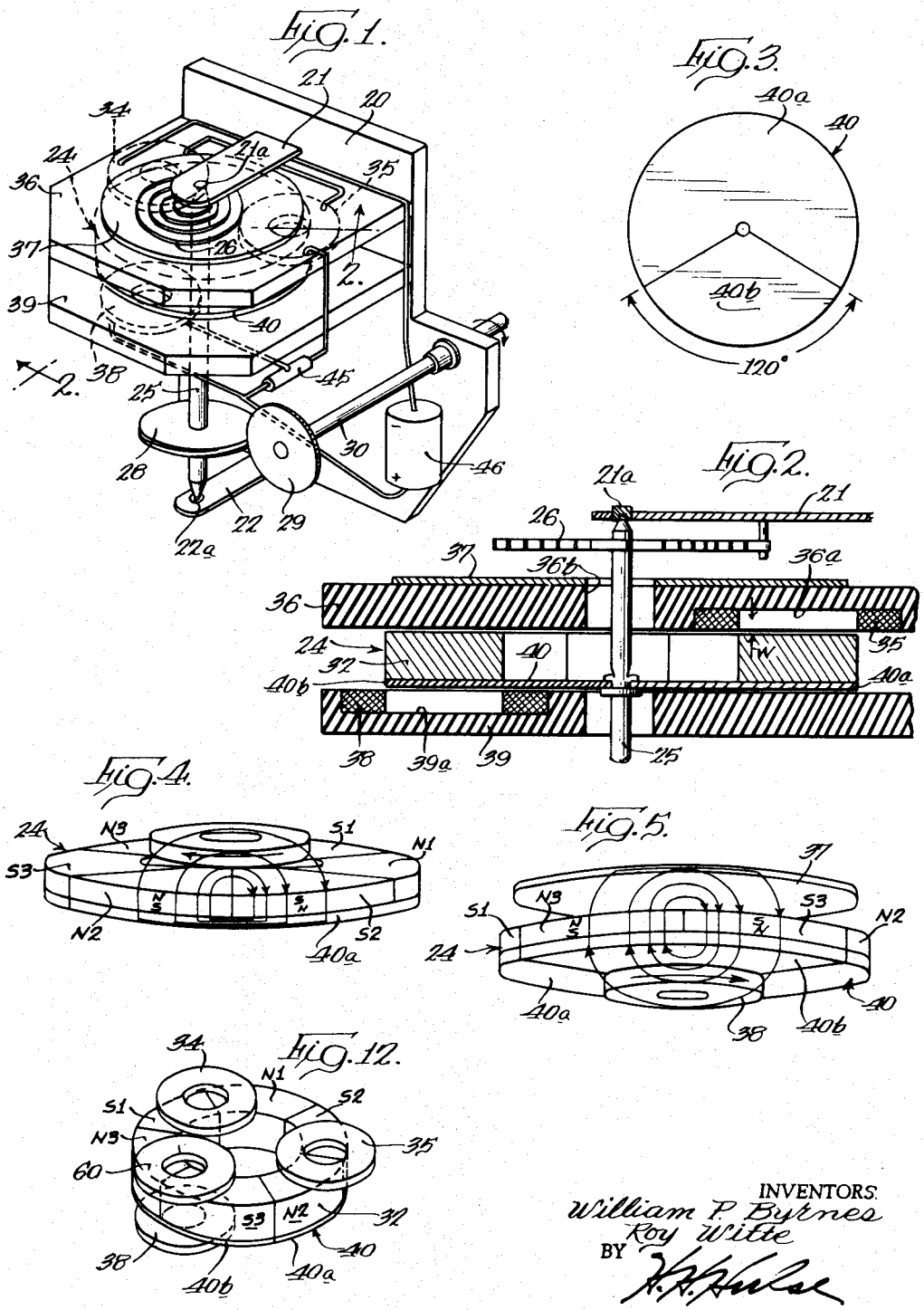

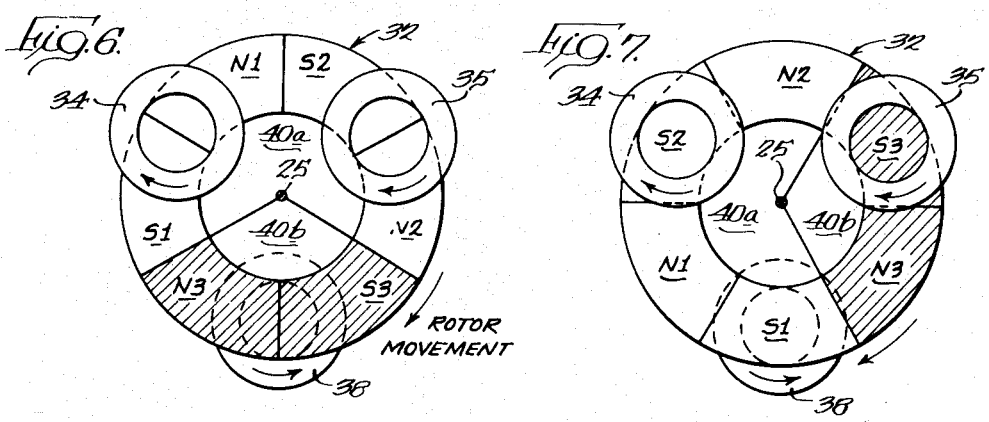
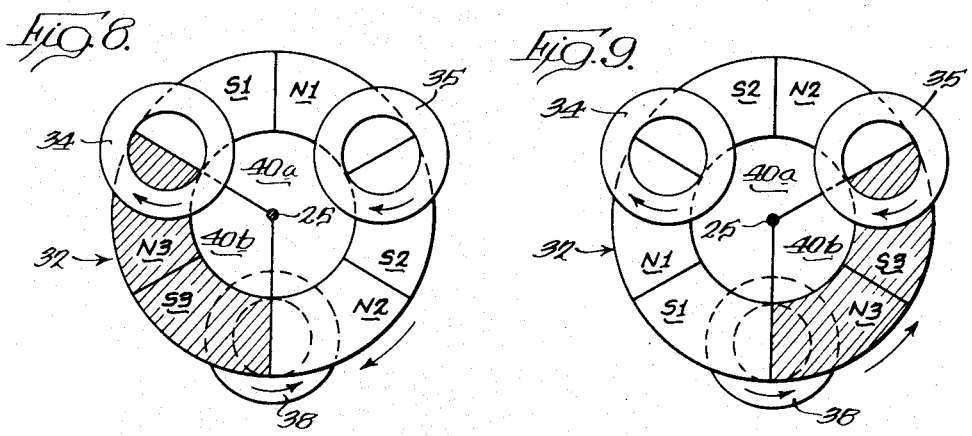
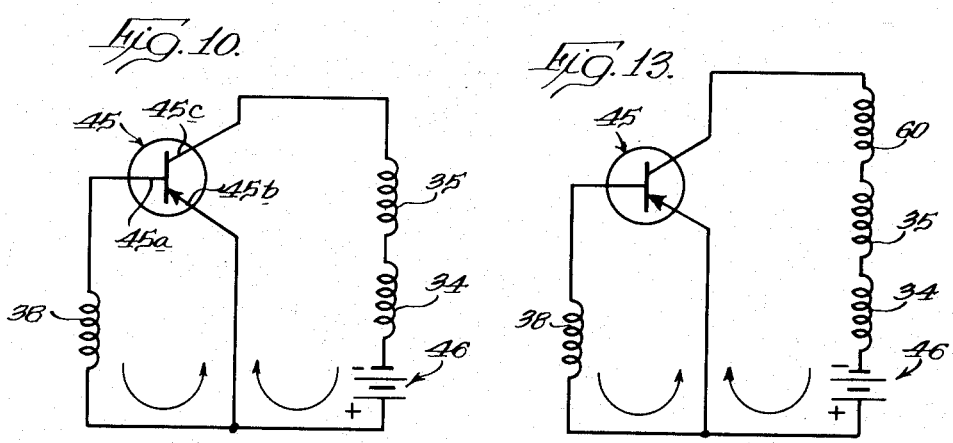

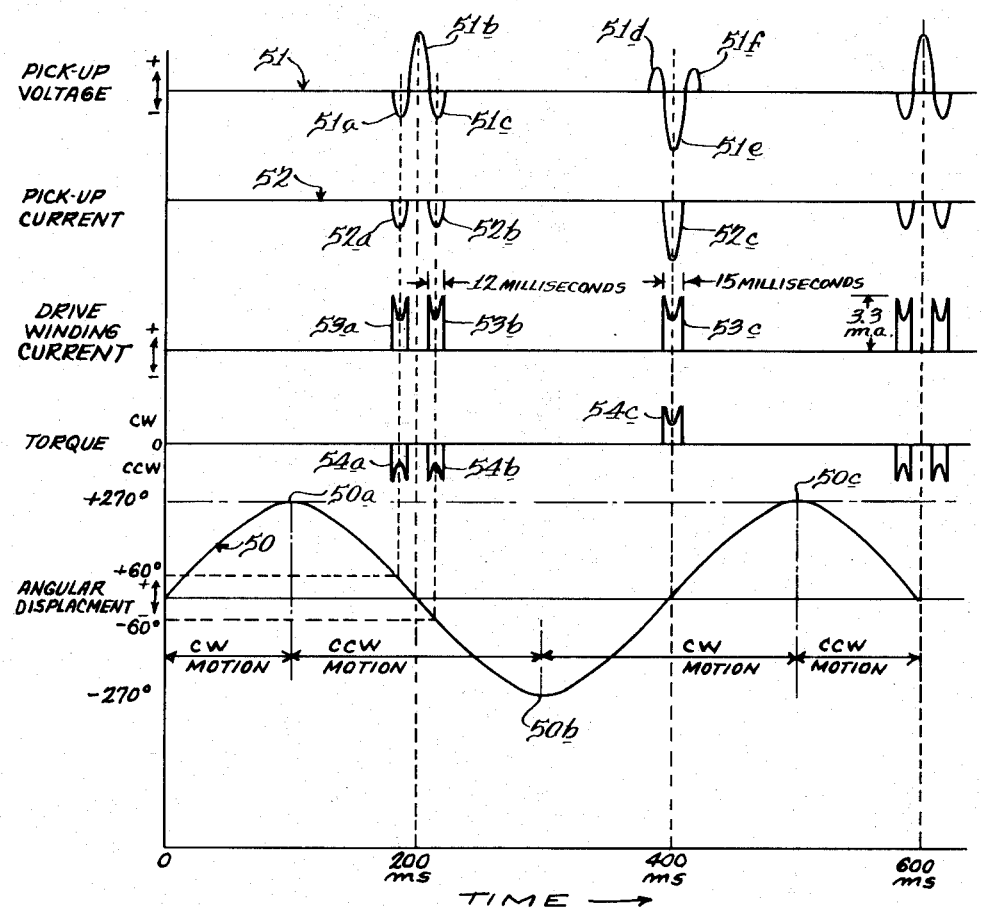

William P. Byrnes, Glenview, and Roy Witte, West Hartford, Ill., assignors to General Time Corporation, New York, N.Y., a corporation of Delaware
Filed June 24, 1958, Ser. No. 744,262
8 Claims. (Cl. 318—132)

This invention has to do with timekeeping devices, and is more particularly concerned with electrically powered oscillatory balances.

The general aim of the invention is to bring forth a commercially practical, small size, high efficiency oscillatory balance which can be operated with a high degree of timing precision for some months or years from one small battery, and with almost total immunity from wear or breakage of parts.

An important object of the invention is to increase the magnitude of torque pulses imparted to a balance rotor for a given magnitude of source voltage and a given field strength of the permanent magnet employed. This assures a high amplitude of balance motion (e.g., one and a half turns, peak-to-peak) with a relatively stiff hairspring, promoting high precision of timing. It also enables the moving balance to be supplied with the necessary driving energy to overcome friction, windage, and loading, yet without sacrificing precision of timing.

Another object is to provide an electrically powered oscillatory balance in which flux linkages with drive windings (product of the winding turns and the magnetic lines of force passing through such turns) are maximized to promote high efficiency.

It is a further object to provide such a balance in which a permanent magnet having a plurality of pairs of poles is employed to create a large number of flux linkages, and in which torque pulses are applied to the rotor only when the latter is passing substantially through its dead center position. This also contributes to the precision of timing.

Other objects and advantages will become apparent as the following description proceeds, taken in conjunction with the accompanying drawings, in which:

FIGURE 1 is a perspective view of an oscillatory balance mechanism embodying the features of the invention;

FIG. 2 is a vertical section, taken substantially along the line 2—2 in FIG. 1;

FIG. 3 is a plan view of a segmented magnetic shield used in the balance mechanism;

FIGS. 4 and 5 are fragmentary perspective views illustrating the distribution of magnetic flux emanating from a permanent magnet;

FIGS. 6 and 7 are stop-motion views of the several windings of the rotor at two relative angular positions, specifically with the rotor at its dead center and at its peak angular position of 270°;

FIGS. 8 and 9 are stop-motion views of the several windings and the rotor, showing the latter passing through positions in which it is displaced 60° on opposite sides of its dead center position;

FIG. 10 is a schematic diagram of the electrical components and connections;

FIG. 11 is a graphic illustration of rotor displacement, pick-up voltage, pick-up current, drive current, and torque—all plotted against time;

FIG. 12 is a perspective view of windings and a permanent magnet illustrating a second embodiment of the invention; and FIG. 13 is a schematic wiring diagram for the second embodiment.

While the invention has been shown and will be described in some detail with reference to particular embodiments thereof, there is no intention that it thus be limited to such detail. On the contrary, it is intended here to cover all modifications, alternatives and equivalents falling within the spirit and scope of the invention as defined by the appended claims.

Referring now to FIG. 1, the oscillatory balance mechanism there illustrated comprises a support member 20 from which upper and lower horizontal brackets 21, 22 extend. A rotor 24 is journaled for rotational movement by jewel pivot bearings 21a, 22a, which are held in the brackets and which receive the tapered ends of a rotor staff or shaft 25. To limit the angular rotation of the rotor 24 and to cause the latter to have periodic harmonic motion, a spiral hairspring 26 is connected between the upper bracket 21 and the shaft 25. As is well known, once the rotor 24 is set in motion, it will oscillate back and forth with each cycle of movement occurring in substantially the same elapsed time period. The frequency or period of such oscillatory movement is determined by the moment of inertia of the rotor 24 and the constant of the spring 26. The time period for each cycle of oscillation will be substantially constant and independent of amplitude.

As here shown, the lower end of the shaft 25 carries a cam wheel 28 cooperatively associated with a pin wheel 29 fixed to a shaft 30. The wheels 28, 29 form a one-way drive connection from the balance rotor 24 to the shaft 30, so that the latter will be rotated with timed steps in one direction as the rotor oscillates back and forth. The shaft may be connected, for example, through reduction gearing through the hands of a clock (not shown) or any other utilization device.

As the rotor 24 oscillates, there will inevitably be energy losses due to friction, air resistance, and hysteresis of the spring 26. Some energy will be required also to drive the shaft 30. To supply this energy and sustain the oscillations of the rotor 24, electromagnetic means powered from a small battery or other voltage source are employed. But in order to make most efficient use of that energy and to apply it to the rotor without disrupting the natural frequency of oscillation, short torque pulses are imparted to the rotor in a direction to aid its oscillatory movement, and only when the rotor is substantially in, or passing through, its dead center position. The term "dead center position" as used herein denotes the angular position in which the rotor would eventually come to rest with the spring 26 unstressed. This is the angular position in which the rotor will have its maximum velocity during each oscillatory cycle.

For this purpose, a part of the rotor 24 and, indeed, the flywheel, is constituted by a permanent magnet 32 fixed to the shaft 25. In keeping with an important aspect of the invention, however, the permanent magnet 32 is constructed to have a relatively large number of poles and, in any event, more than two. As here exemplified, the permanent magnet 32 is annular in shape, lying parallel to a plane which is transverse to the axis of rotation, i.e., the axis of the shaft 25. The rotor has six segmental areas, each approximately 60° in angular extent, alternate ones of which are oppositely polarized in a direction parallel to the axis of rotation. In the plan view (FIG. 6) the magnet 32 has three pairs of opposite poles labeled N1, S1; N2, S2; and N3, S3.

In effect, each of the six polarized segments is a separate magnet with its opposite poles displaced in a direction parallel to the axis of the shaft 25. As shown in FIG. 4, for example, the segment N2 has a north pole on its upper surface and a south pole on its lower surface, while the polar segment S2 has a south pole on its upper surface and a north pole on its lower surface. The magnetic flux passes from one polar segment to the next in an arcuate pattern, as illustrated in FIG. 4. A similar pattern of magnetic flux would pass between the lower surfaces of the several polarized segments, as shown in FIG. 5, except for shielding means which will be described below.

To cooperate with permanent magnet 32, a plurality of drive windings are employed. These are located and energized with current in such manner as to impart torque pulses to the rotor 24. As here shown, two drive windings 34 and 35 are stationarily mounted adjacent one side of the permanent magnet 32. They are supported in recesses 36a formed in the underside of a shelf 36 made of non-magnetic material and projecting from the support 20. Each of the drive windings 34, 35 is held with very slight spacing above the upper surface of the magnet 32, the shelf 36 being centrally apertured as at 36b so that the shaft 25 can freely project therethrough.

As shown best in FIG. 6, the drive windings 34, 35 are wound with a diameter such that they overlie an area which is approximately equal to that of one of the permanent magnet segments. The two drive windings are angularly spaced apart around the shaft 25 by an angle (here 120°) which is equal to an even multiple of that angle subtended by one of the permanent magnet segments. Moreover, each drive winding 34, 35 is located in the shelf 36 such that it is substantially centered about the junction between two polarized areas of the permanent magnet 32 when the rotor 24 is in its dead center or equilibrium position. From FIG. 6, which illustrates the permanent magnet 32 in its dead center position relative to the windings, it will be seen that the winding 34 is centered about the junction between the polar areas S1 and N1 while the winding 35 is centered about the junction between the polar areas S2 and N2.

An annular plate 37 made of high permeability material is supported on the upper surface of the shelf 36, being physically interposed between the drive windings 34, 35 and the hairspring 26. This plate 37 serves two purposes. It provides a low-reluctance portion for the path of flux passing upwardly from the permanent magnet through the drive windings and thence downwardly to the next polar segment of the magnet. Secondly, it prevents magnetic flux emanating from the magnet 32 from reaching the hairspring 26, thereby avoiding magnetization of the spring, generation of eddy currents therein, and extraneous magnetic forces on the rotor which might affect the timed movement of the latter.

In order properly to phase the excitation of the drive windings 34, 35 relative to the position of the rotor, a pick-up winding 38 is employed. It is mounted closely adjacent to the permanent magnet 32 and positioned such that it is substantially centered about the junction between two of the polar areas when the rotor 24 is in its dead center position. As here exemplified in FIGS. 1, 2 and 6, the pick-up winding 38 is held within a recess 39a formed in the upper surface of a second apertured, non-magnetic shelf 39 projecting from the support member 20. It will be seen from FIG. 2 that the pick-up winding 38 is closely spaced to the lower surface of the permanent magnet 32, and it is centered about the junction between the polar areas N3, S3 when the rotor 24 is in its dead center position (FIG. 6).

If the permanent magnet 32 were rotating, voltage pulses successively alternating in polarity would be induced in the pick-up winding 38 as the junctions between successive ones of the polar areas passed above the winding. Of course, the polarity of such voltage pulses would be reversed if the direction of rotation were reversed. For an important purpose to be made clear below, means are provided to prevent such induction of voltage and current in the pick-up winding 38 except as a result of changing linkages with flux emanating from the particular pair of polar areas which lie opposite that winding when the rotor is in its dead center position. To accomplish this, a magnetic shield 40 is interposed between the permanent magnet 32 and the winding 38, such shield being constructed to shunt flux emanating from the polar areas N1, S1, and N2, S2.

As shown in FIG. 3, the shield 40 is shaped physically as an annular plate, having a first portion 40a made of a high permeability material (such as soft steel) and a second segmental portion 40b made of low permeability or para-magnetic material (such as brass). If desired, the segmental portion 40b which subtends an arc of 120° and underlies the polar areas N3, S3 may be omitted, simply leaving an air space in its place. The terms "high permeability" and "low permeability" as used herein are intended to denote magnetic permeabilities on the order of those possessed by soft iron and air, respectively.

The shield plate 40 is mounted on the underside of the permanent magnet 32, with the low permeability portion 40b underlying the polar areas N3, S3. The location of these particular areas is indicated in FIGS. 6-9, for convenience, by cross-hatching. When the rotor 24 is in its dead center position, therefore, flux from the polar areas N3, S3, will link with the turns of the pick-up winding 38 (FIGS. 5 and 6). If the rotor is moving in one direction or the other, a voltage of one polarity or the other will be induced in the pick-up winding. On the other hand, the high permeability portion 40a of the shield 40 underlies the polar areas N1, S1 and N2, S2 so that flux from the lower faces of these areas is shunted through the shield (FIG. 4). When these polar areas pass over the pick-up winding 38, flux is substantially prevented from linking with that winding, and even though the rotor 24 is moving, no voltage or current will be induced in the pick-up winding 38 (see FIG. 7).

The voltages induced in the pick-up winding 38 are utilized to control the application of current to the drive windings 34, 35. For this purpose, a current-responsive controlled discharge device is employed. Preferably, such device takes the form of a transistor 45 which is characterized by small size, low power consumption, reliability, and long life. Referring to FIG. 10, the transistor 45 is of the PNP junction type, having a base terminal 45a, an emitter terminal 45b, and a collector terminal 45c. The pick-up winding 38 is connected across the transistor input terminals, here the base 45a and emitter 45b, while the two drive windings 34, 35 are connected in series with a voltage source or battery 46 across the output terminals, i.e., the emitter 45b and collector 45c. Whenever a negative voltage (of the polarity indicated in FIG. 10) is induced in the pick-up winding 38, a small current will flow from the emitter terminal 45b to the base terminal 45a. This base current will create a conductive path between the emitter terminal 45b and the collector 45c, so that the battery 46 will send current through the drive windings 34, 35. On the other hand, if a voltage of opposite (positive) polarity is induced in the pick-up winding 38, current cannot flow from the base 45a to the emitter 45b, and the battery cannot supply current through the drive windings 34, 35.

To set the balance in operation, the rotor 24 is manually or otherwise displaced from dead center to stress the spring 26. When released, the rotor will return to and pass through its dead center position, thereafter continuing on oscillatory motion due to torque pulses applied to the rotor by the drive windings 34, 35.

Assuming that the rotor 24 has reached the maximum displacement (e.g., about 270°) from dead center in a clockwise direction, as shown in FIG. 7 and as indicated at point 50a on the rotor displacement graph 50 in FIG. 11, its annular velocity is zero but the spring 26 is fully stressed. The spring will thus return the rotor in a counterclockwise direction. No voltage will be induced in the pick-up winding 38 because of the shield 40 until the rotor reaches that position shown in FIG. 8, displaced about 60° from dead center. At this instant, the left side of the pick-up winding 38 will be linked by magnetic flux emanating from beneath the polar area S3. Such flux and the counterclockwise motion of the permanent magnet will result in the induction of a relatively low amplitude negative voltage pulse 51a shown in the pick-up voltage graph 51 (FIG. 11). This voltage will result in current flow from the emitter terminal 45b to the base terminal 45a (FIG. 10), such current being indicated at 52a in the pick-up current graph 52 (FIG. 11). Accordingly, a current pulse 53a (FIG. 11) will flow from the battery 46 through the drive windings 34, 35 (FIG. 10), such current flow being in a direction to set up electromagnetic fields which attract the permanent magnet poles S1, S2 and repel the permanent magnet poles N1, N2 (FIG. 8). Accordingly, a short torque pulse 54a (FIG. 11) will be electromagnetically imparted in a counterclockwise direction to the rotor, aiding and reinforcing the rotor's motion.

As the rotor 24 continues its counterclockwise movement and passes through its dead center position, flux from the polar areas N3, S3 will link with the respective sides of the pick-up winding 38, inducing a relatively high amplitude voltage pulse 51b (FIG. 11) in that winding. However, the polarity of this pulse is positive so that no appreciable current flows from the emitter terminal 45b to the base terminal 45a (FIG. 10), and no current can flow in response through the drive windings 34, 35.

As the rotor continues its counterclockwise motion and reaches the position shown in FIG. 9, displaced some 60° from its dead center position, flux from the underside of the polar area N3 will then link with the right side of the pick-up coil 38. The direction of motion and the direction of flux will be such that a relatively low amplitude voltage pulse 51c (FIG. 11) of negative polarity will be induced in the pick-up winding 38, causing an emitter-base current pulse 52b to flow in the transistor 45 (FIG. 10), so that a current pulse 53b is passed from the battery 46 through the emitter-collector circuit and the drive windings 34, 35. The short current pulse 53b (FIG. 11) causes electromagnetic fields to be set up by the drive windings 34, 35 which repel the poles N1, N2 and attract the poles S2 and S3. Accordingly, a relatively short duration torque pulse 54b (FIG. 11) is imparted to the permanent magnet 32 and the rotor 24, reinforcing and aiding the counterclockwise motion of the latter.

The rotor 24 will then continue its counterclockwise motion until the hairspring 26 is sufficiently wound up to bring its velocity to zero. This is illustrated at point 50b on the graph 50 (FIG. 11). After that, the spring 26 will reverse the direction of rotor motion so that it moves in a clockwise direction. No voltages will be induced in the pick-up winding 38 during the interval that the rotor is appreciably displaced from its dead center position, because the magnetic shield 40 prevents interaction of flux emanating from the lower surfaces of the polar areas N1, S1 and N2, S2. When the rotor has returned to the angular position illustrated in FIG. 9, but is moving in a clockwise direction, a small positive voltage pulse 51d will be induced in the pick-up winding 38. However, because this voltage pulse is positive it cannot cause current flow in the emitter-base circuit of the transistor 45 (FIG. 10) so that no current results in the drive windings 34 and 35.

Then, as the rotor 24 continues the clockwise motion and reaches a dead center position (FIG. 6), a relatively large amplitude negative voltage pulse 51e (FIG. 11) will be induced in the pick-up winding 38. This causes a corresponding current pulse 52c to flow in the emitter-base circuit of the transistor 45 (FIG. 10), so that a corresponding current pulse 53c (FIG. 11) flows from the battery 46 through the drive windings 34 and 35. This current pulse 53c sets up electromagnetic fields in the windings 34, 35 which repel the polar areas N1 and N2, while attracting polar areas S1 and S2, thereby imparting a positive torque pulse 54c (FIG. 11) to the rotor, augmenting and aiding the clockwise motion of the latter.

As the rotor 24 continues its clockwise rotation and reaches the position illustrated in FIG. 8, a low amplitude voltage pulse 51f will be induced in the pick-up winding 38. However, this can cause no appreciable current flow in either the emitter-base or the emitter-collector circuits of transistor 45 (FIG. 10) so that no current flows through the drive windings 34, 35.

The rotor then continues its clockwise motion until it reaches the limit point represented at 50c on the graph 50 (FIG. 11). The rotor then begins its counterclockwise motion and the cycle of operation described above repeats over and over.

The drive current pulses 53a–c and the torque pulses 54a–c are in general of a rectangular shape. However, when the transistor 45 is rendered conductive in response to negative pickup current pulses 52a–c, the poles of the permanent magnet 34 are moving relative to the drive windings 34, 35. Thus, a counter electromotive force is induced in those windings which opposes the voltage of the battery 46 and tends to reduce the current flow. For this reason the drive current pulses 53a–c and the torque pulses 54a–c are shaped as shown in FIG. 11, being depressed in their midportions due to the counter electromotive force.

As shown by way of example in FIG. 11 each half cycle of the rotor's motion occurs in a 200 millisecond period; a complete cycle occupies 400 milliseconds. Since this period remains almost perfectly constant, the oscillatory motion of the balance shaft results in the output shaft 30 (FIG. 1) being angularly stepped uniformly with the passage of time.

Simply by way of example, it has been found in one typical embodiment that the wider drive current pulse 53c (FIG. 11) is of approximately 15 milliseconds in duration, while each of the narrower current pulses 53a, 53b is approximately 12 milliseconds in duration. The amplitude of these pulses, assuming the battery 46 to be 1.5 voltage source, has a peak value of approximately 3.3 milliamperes. Since these pulses occupy such a relatively small proportion of the total elapsed time for each cycle of oscillation, however, the average current drain from the battery 46 would be approximately .32 milliamperes, if the pulses were flat-topped. But because the current decreases from the peak value during the midportion of each pulse, due to the induced counter electromotive force, it has been found that the actual average current drain from the battery 46 is about .19 milliampere. Under these conditions the battery 46 can have extremely long life. It is important to give the rotor a relatively high amplitude of angular oscillation in order that the current pulses supplied by the battery to the drive windings will be considerably spaced apart in time. This reduces the average current drain on the battery 46 and gives the latter a longer effective operating life.

There is unusual and advantageous cooperation between the components of the oscillatory balance described above. First, as explained above it is desirable to keep the amplitude of rotor motion relatively high, i.e. on the order of 270°. This reduces the average current drain on the battery 46 as well as makes the time period immune to minor disturbances. In order to keep the rotor oscillation amplitude large, it is desirable to make the torque pulses exerted thereon as high as possible for a given magnitude of voltage supplied by the battery 46 and a given field strength of the permanent magnet poles. To accomplish this, the drive winding powered from the battery 46 is given a relatively large number of turns. By constructing the drive winding to have two or more sections 34 and 35 connected in series, each section may be made relatively thin for a given number of total turns, so that the average width w (FIG. 2) of the air gap between the upper surface of the magnet 32 and each turn is held very small. The average reluctance of the magnetic flux path from the permanent magnet through each drive winding turn is thus made low, due to the narrow air gap. In this manner, the number of flux linkages between the permanent magnet field and each of the turns of the drive windings 34, 35 is made greater than would be the case if a thicker coil were employed and established a wider average air gap.

However, to take advantage of two thin drive windings so that each simultaneously contributes to the torque pulses, they are circularly spaced apart about the axis of the rotor, and the permanent magnet 32 is constructed to have several pairs of poles. Current passed through the two windings 34 and 35 thus sets up two electromagnetic fields which interact with different pairs of permanent magnet poles, each producing torque in the same direction to sustain the rotor motion.

It is highly desirable for precision of timing that the torque pulses be applied to the rotor 24 when it is near its point of maximum velocity and when the spring 26 is substantiallly unstressed. To apply the torque pulses at other instants is to disturb the natural period of oscillation which the balance rotor otherwise has. But if a permanent magnet having several pairs of poles is employed in order to accommodate the utilization of plural drive windings, and thus produce increased flux linkages due to shorter air gaps, a pick-up winding would then have voltages induced in it when the rotor is considerably displaced from its dead center position. That difficulty is overcome in the present device through the use of the segmental magnetic shield 40 which prevents any voltage from being induced in the pick-up winding, and any torque pulses from being applied to the rotor, except when the latter is at or near its dead center position (FIGS. 6, 8 and 9).

The over-all result is an electrically powered balance in which the number of effective turns for the drive windings is great, yet in which the linkages of flux from a permanent magnet with each turn of those windings is relatively high. For a given voltage and a given current supplied by the battery 46, and a given field strength of the permanent magnet 32, the torque pulses applied to the rotor are relatively great. In this manner, a high amplitude of rotor oscillation is achieved and the necessary energy is supplied to overcome losses and loading of the rotor. This energy, nevertheless, is applied to the rotor only when the latter is in or near its dead center position, so that the natural frequency of rotor oscillation is not disturbed.

Referring now to FIGS. 12 and 13, a modified embodiment of the invention is there illustrated. This embodiment differs from that previously described in connection with FIGS. 1–11 only in that a third drive winding 60 is disposed with close spacing above the permanent magnet 32, being angularly spaced from the other two drive windings 34 and 35. As shown in FIG. 12, the third drive winding 60 is so positioned that it is centered about the junction between the polar areas N3, S3 when the rotor is in its dead center position. The third drive winding 60 is connected in series with the other two drive windings 34, 35 as shown in FIG. 13.

Accordingly, for a given total number of turns in the windings 34, 35 and 60, the average width of the air gap from the upper surface of the permanent magnet 32 to each turn in the three drive windings is reduced even further, and linkages with magnetic lines of force from the polar areas of the magnet are further increased. The operation of this modification is substantially the same as that previously described except that each of the three windings 34, 35 and 60 will contribute to the total amplitude of torque pulses imparted to the rotor in the manner previously explained.

It will be apparent that any number of polar areas may be given to the magnet, and any number of drive windings may be employed in following the teachings of this invention. Moreover, it will be apparent to those skilled in the art that in some instances the permanent magnet may be made stationary and the pick-up and drive windings rotatable without departing from the scope of the invention.

We claim as our invention:

1. In an oscillatory balance, the combination comprising a rotor journaled for rotation, a spring connected with said rotor, a permanent magnet fixed to said rotor and having a plurality of pairs of poles, a pair of stationary drive windings each fixedly mounted adjacent said magnet and disposed opposite a different pair of said poles when said rotor is in its dead center position, a pick-up winding fixedly mounted adjacent said magnet and disposed opposite one pair of said poles when the rotor is in its dead center position, means for preventing magnetic flux from all of said poles except said one pair from linking with said pick-up winding as the rotor turns, and means responsive to voltage of one polarity induced in said pick-up winding for supplying current pulses to said drive windings, so that torque pulses for sustaining oscillations of said rotor are imparted to the latter only when it is passing through substantially its dead center position.

2. In an oscillatory balance, the combination comprising a rotor and a spring connected therewith, a permanent magnet having more than one pair of circularly disposed areas alternate ones of which are polarized in opposite senses, a plurality of drive windings disposed in closely spaced relation to said permanent magnet, a pick-up winding disposed in closely spaced relation to said permanent magnet, means mounting said magnet and said windings for relative rotation as said rotor turns, said drive windings each being centered about the junction between a different pair of said polarized areas when said rotor is in its dead center position, means for magnetically shielding said pick-up winding from all but two of said polarized areas, means mounting said pick-up winding centered about the junction of said two areas when said rotor is in its dead center position, and means for supplying current pulses to all of said drive windings in response to voltage of one polarity induced in said pick-up winding.

3. In an oscillatory balance, the combination comprising a rotor journaled for rotation, a hairspring connected to said rotor, a relatively flat permanent magnet mounted on said rotor and having more than two areas disposed circularly about the axis of rotation, alternate ones of said areas being polarized in opposite senses along a direction parallel to said axis, a plurality of flat drive windings fixedly mounted parallel to and closely spaced from one side of said permanent magnet, said drive windings each being disposed in centered relation about a different junction between two of said areas when the rotor is in its dead center position, a flat pick-up winding fixedly mounted parallel to and closely spaced from the opposite side of said permanent magnet and centered about a junction between two of said areas when the rotor is in dead center position, a magnetic shield mounted on the rotor and shielding all but said last-named two areas of the magnet from said pick-up winding, and amplifying means for supplying current pulses to said drive windings in response to induction of voltage pulses of one polarity in said pick-up winding.

4. In an oscillatory balance, the combination comprising a rotor journaled for rotation, a torsion spring connected with said rotor for giving the latter harmonic motion in response to torque pulses, a circular permanent magnet fixed to said rotor and having a plurality of pairs of segments successive ones of which are polarized in opposite senses in a direction parallel to the axis of rotation, a plurality of flat drive windings sized to substantially overlie one of said segments, means for fixedly mounting said drive windings closely adjacent and parallel to one side of said permanent magnet and with each such winding substantially centered about the junction between different pairs of said segments when the rotor is in its dead center position, a flat pick-up winding sized to substantially overlie one of said segments, means for fixedly mounting said pick-up winding closely adjacent and parallel to the opposite side of said permanent magnet and substantially centered about the junction between two of said segments when the rotor is in dead center position, a high permeability shield fixed to said opposite side of said permanent magnet and having a low permeability segmental portion disposed opposite said two segments, a discharge device having input and output terminals, means connecting said input terminals to said pick-up windings, and means including a voltage source connecting said output terminals to said drive windings.

5. In an oscillatory balance, the combination comprising a support, a rotor journaled on said support, a torsion spring connected to the rotor for imparting angular harmonic motion to the latter in response to torque pulses, an annular permanent magnet fixed to the rotor with its geometric axis coincident to the axis of rotation, said magnet having six segments successive ones of which are oppositely polarized in a direction parallel to said axis, two circular, flat drive windings sized to embrace an area substantially equal to that of one of said segments, means mounting said drive windings on said support with each closely adjacent and parallel to one side of said permanent magnet, said last means locating said drive windings substantially centered respectively about the junctions of first and second pairs of said segments when said rotor is in its dead center position, a metal plate of high permeability overlying said drive windings to provide a flux return path to said magnet, a single pick-up winding, means mounting said pick-up winding on said support in closely spaced parallel relation to the opposite side of said magnet, said last-named means also locating said pick-up winding substantially centered about the junction between a third pair of said segments when the rotor is in its dead center position, a metal plate fixed to said opposite side of said magnet and having a portion of low permeability material overlying said third pair of segments and a portion of high permeability material overlying said first and second pairs of segments, a transistor having emitter, base and collector terminals, means connecting said pick-up winding across said emitter and base terminals, a battery, and means connecting said battery and said power coils in series across said emitter and collector terminals.

6. In an electrically powered oscillatory balance having a journaled rotor connected with a torsion spring and a permanent magnet fixed to said rotor and producing magnetic flux, that improvement which comprises two flat and thin power coils disposed in closely spaced cooperative relation to said magnet for imparting torque pulses to the latter in response to current flow through such coils, a single pick-up coil disposed in closely spaced relation to said magnet, means for supplying current pulses to said power coils in response to currents induced in said pick-up coil, said last-named means including means for making said rotor oscillate with an angular amplitude on the order of 270°, and means for shunting the magnetic flux emanating from said permanent magnet to prevent induction of currents in said pick-up coil except when the rotor is substantially passing through its dead center position.

7. In an oscillatory balance, the combination comprising a rotor journaled for rotation, a spring connected with said rotor for giving the latter harmonic motion, a permanent magnet fixed to said rotor and having a plurality of pairs of poles, a stationary drive winding fixedly mounted adjacent said magnet and disposed opposite one of said pairs of poles when said rotor is in its dead center position, a pick-up winding fixedly mounted adjacent said magnet and disposed opposite a certain one pair of said poles when said rotor is in its dead center position, shielding means interposed between said magnet and said pick-up winding for preventing magnetic flux from all of said poles except said certain one pair from linking with said pick-up winding as the rotor turns, and means responsive to voltage of one polarity induced in said pick-up winding for supplying current pulses to said drive windings so that torque pulses for sustaining oscillations of said rotor are imparted to the latter only when it is passing substantially through its dead center position.

8. In an electrically powered oscillatory balance, the combination comprising a first member including a permanent magnet having a plurality of pairs of oppositely polarized areas, a second member including a drive winding and a pick-up winding, means journaling said first and second members for relative rotation to move said polarized areas relatively past said windings, a spring interconnected between said first and second members to make them have relative angular harmonic motion, said first and second members being so oriented that said drive winding is opposite a first pair of said polarized areas and said pick-up winding is opposite a second pair of said poles when said spring is unstressed, shielding means for preventing flux from all of said polarized areas except said second pair from linking with said pick-up winding, and amplifying means responsive to induced currents of one polarity in said pick-up winding for supplying current pulses to said drive winding.

References Cited in the file of this patent
UNITED STATES PATENTS

| | | |
|---|---|---|
| 2,829,324 | Sargeant | Apr. 1, 1958 |
| 2,843,742 | Cluwen | July 15, 1958 |

FOREIGN PATENTS

| | | |
|---|---|---|
| 1,090,564 | France | Oct. 20, 1954 |
| 1,092,411 | France | Nov. 10, 1954 |